E. R. PLAYLE.
Cupola Furnace.
No. 82,160.
Patented Sept. 15, 1868.
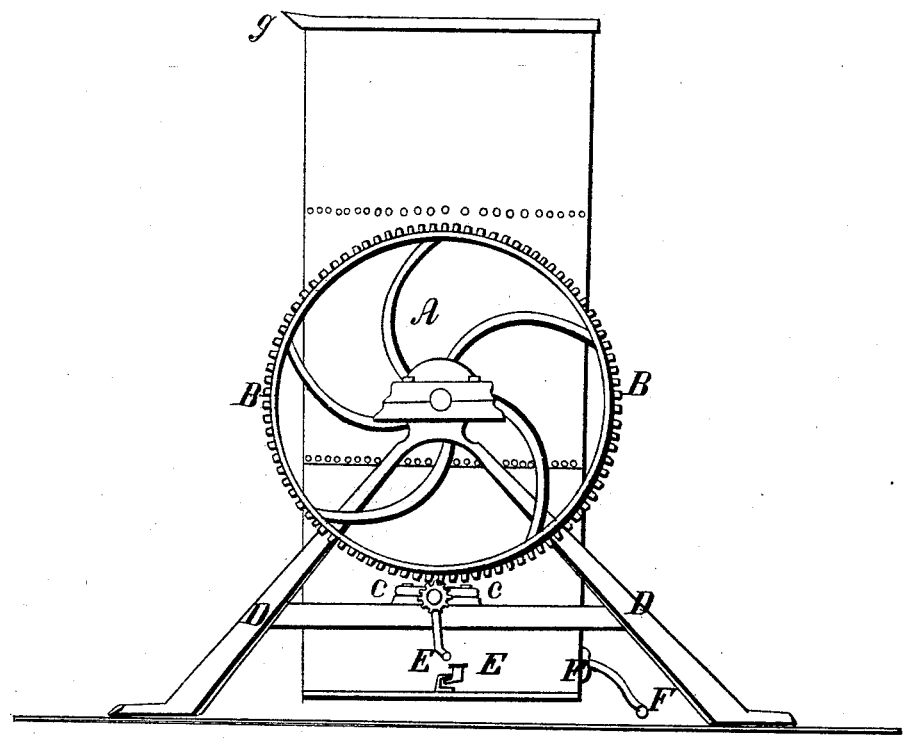
Witnesses.
Thomas Allison
Jo. K. Averill
Inventor.
E. R. Playle

United States Patent Office.

EDWARD R. PLAYLE, OF GREAT BEND, PENNSYLVANIA.

Letters Patent No. 82,160, dated September 15, 1868.

IMPROVED FURNACE FOR MELTING STEEL, IRON, &c.

The Schedule referred to in these Letters Patent and making part of the same.

TO ALL WHOM IT MAY CONCERN:

Be it known that I, EDWARD R. PLAYLE, of Great Bend, in the county of Susquehanna, and State of Pennsylvania, have invented a new and useful Improvement in Steel-Furnaces; and I do hereby declare that the following is a full, clear, and exact description of the construction and operation, reference being had to the accompanying drawings, and to the letters of reference marked thereon, in which—

Figure 1 is a perspective view.
Letter A is the body of the furnace.
Letters B B are the gear-wheel.
Letters C C are the power cog-wheel.
Letters D D are the frame.
Letters E E are the bottom hooks.
Letters F F are the blow-pipe.
Letters O O are the trunnions.

The nature of my invention consists in setting a furnace on trunnions, in or near the centre, with power-gear attached, so as to pour the metal out of the top, instead of taking out the crucibles, as in the old method or plan.

I construct my furnace on the following plan to convert one ton of iron into steel: The furnace A has a sheet-iron case, lined up with fire-brick, six feet high and four feet in diameter. Then bolt on the trunnions O O at or near the centre. The trunnions should rest on the frame D D. The right-hand trunnion should extend past the frame, so as to put on the lever-wheel B B. The power-wheel C C is attached to the frame D D, directly under the large wheel B B, as shown in fig. 1.

To operate my furnace, all that is to be done is to turn the power-wheel C C, and the furnace will easily turn or tip down so as to let the metal be run out into the mould or ladle.

As my improvement appertains only to the tipping-arrangement, it is deemed unnecessary to describe other parts that are well known to those skilled in the art.

What I claim as new, and desire to secure by Letters Patent, is—

The furnace A, when suspended on trunnions with power-gear attached, for the purpose herein described.

E. R. PLAYLE.

Witnesses:
   THOMAS ALLISON,
   JAS. K. AVERILL.